United States Patent [19]

Blakely et al.

[11] Patent Number: 5,560,972

[45] Date of Patent: Oct. 1, 1996

[54] LATEX FUSION BONDED PILE CARPETS AND CARPET TILE

[75] Inventors: Lawrence W. Blakely; Michael A. Howe, both of LaGrange, Ga.

[73] Assignee: Interface, Inc., Atlanta, Ga.

[21] Appl. No.: 300,941

[22] Filed: Sep. 6, 1994

Related U.S. Application Data

[63] Continuation of Ser. No. 808,423, Dec. 16, 1991, abandoned, which is a continuation-in-part of Ser. No. 713,300, Jun. 11, 1991, abandoned, which is a continuation of Ser. No. 224,057, Jul. 25, 1988, abandoned.

[51] Int. Cl.$^6$ .............................. B32B 3/02; D03D 27/00
[52] U.S. Cl. .............................. 428/95; 428/92; 428/93; 428/94; 428/97
[58] Field of Search .............................. 428/92, 93, 94, 428/95, 97

[56] References Cited

U.S. PATENT DOCUMENTS

| | | | |
|---|---|---|---|
| 1,784,552 | 12/1930 | Smith et al. | |
| 1,822,509 | 9/1931 | Smith. | |
| 1,822,510 | 9/1931 | Smith. | |
| 1,825,827 | 10/1931 | Smith. | |
| 1,844,838 | 2/1932 | Buffington. | |
| 1,864,478 | 6/1932 | Ward. | |
| 1,869,531 | 8/1932 | Ward et al. | |
| 1,924,635 | 8/1933 | Buffington. | |
| 2,101,905 | 12/1937 | Hopkinson | 156/72 |
| 2,116,048 | 5/1938 | Smith. | |
| 2,501,988 | 3/1950 | Buffington. | |
| 2,624,390 | 1/1953 | Groat | 156/72 |
| 3,036,942 | 5/1962 | Squier | 154/49 |
| 3,142,611 | 7/1964 | Mills | 161/66 |
| 3,174,451 | 3/1965 | Heiks | 428/92 |
| 3,271,216 | 9/1966 | Koller | 428/93 |
| 3,309,252 | 3/1967 | Adler | 156/72 |
| 3,332,828 | 7/1967 | Faria et al. | 161/21 |
| 3,411,966 | 11/1968 | Couquet | 156/72 |
| 3,414,458 | 12/1968 | Lacey | 161/67 |
| 3,537,946 | 11/1970 | Truax et al. | 161/66 |
| 3,551,231 | 12/1970 | Smedberg | 156/72 |
| 3,583,936 | 6/1971 | Stahl | 260/28.5 |
| 3,616,138 | 10/1971 | Wentworth | 161/67 |
| 3,661,691 | 5/1972 | Slosberg | 161/67 |
| 3,676,280 | 7/1972 | Sands | 161/67 |
| 3,679,469 | 7/1972 | Moore | 117/161 |
| 3,684,600 | 8/1972 | Smedberg | 156/93 |
| 3,695,987 | 10/1972 | Wisotzky et al. | 161/67 |
| 3,723,213 | 3/1973 | Hoey | 428/93 |

(List continued on next page.)

FOREIGN PATENT DOCUMENTS

| | | |
|---|---|---|
| 678897 | 1/1964 | Canada ............ 428/94 |
| 0315466 | 5/1989 | European Pat. Off. |
| 46-861 | 1/1971 | Japan. |
| 58-131059 | 8/1984 | Japan. |
| 62-70426 | 3/1987 | Japan. |
| 3-19980 | 1/1991 | Japan. |
| 1296109 | 10/1972 | United Kingdom. |

OTHER PUBLICATIONS

Tuttle, John B., "Water Dispersions from Coagulated Rubber, Balata, and Gutta Percha–I," *The India Rubber World* vol. LXVII(1), pp. 213–215, Jan. 1, 1923.
Tuttle, John B. "Water Dispersions from Coagulated Rubber, Balata, and Gutta Percha–II," *The India Rubber World* vol. LXVII (1), pp. 291–293, Feb. 1, 1923.
Tuttle, John B., "Water Dispersions from Rubber, Balata and Gutta Percha III," *The India Rubber World* vol. 68(2), pp. 488–490, May 1, 1923.
Tuttle, John B., "Water Dispersions from Coagulated Rubber, Balata and Gutta Percha–IV," *The India Rubber World* vol. 69(4), pp. 219–220, Jan. 1, 1924.
"Liquid Rubber and Carpets" from *India Rubber World* by Webster Norris; p. 58; Mar. 1, 1931.

*Primary Examiner*—Terrel Morris
*Attorney, Agent, or Firm*—Cheryl K. Zalesky; Kilpatrick & Cody

[57] ABSTRACT

A fusion bonded carpet in which the pile yarn is secured in a non hot-melt latex adhesive base and methods of manufacture of such carpet.

13 Claims, 7 Drawing Sheets

U.S. PATENT DOCUMENTS

| | | | |
|---|---|---|---|
| 3,723,371 | 3/1973 | Campbell et al. | 260/28.5 |
| 3,745,054 | 10/1973 | Smedberg | 161/67 |
| 3,770,558 | 11/1973 | Stahl | 161/65 |
| 3,905,857 | 9/1975 | Short | 428/92 |
| 3,911,185 | 10/1975 | Wright | 428/97 |
| 3,940,525 | 2/1976 | Ballard | 428/96 |
| 3,982,051 | 9/1976 | Taft et al. | 427/207 |
| 4,012,547 | 3/1977 | Smedberg | 428/97 |
| 4,015,036 | 3/1977 | Haemer | 428/95 |
| 4,055,694 | 10/1977 | Hadgraft et al. | 428/95 |
| 4,239,563 | 12/1980 | Iacovello | 156/72 |
| 4,286,003 | 8/1981 | Higgins et al. | 428/95 |
| 4,371,576 | 2/1983 | Machell | 428/92 |
| 4,390,582 | 6/1983 | Pickens, Jr. et al. | 428/95 X |
| 4,405,674 | 9/1983 | Kyle | 428/96 |
| 4,508,771 | 4/1985 | Peoples, Jr. et al. | 428/95 |
| 4,522,857 | 6/1985 | Higgins | 428/95 |
| 4,576,665 | 3/1986 | Machell | 156/72 |
| 4,582,554 | 4/1986 | Bell et al. | 156/247 |
| 4,595,617 | 6/1986 | Bogdany | 428/95 |
| 4,629,642 | 12/1986 | Kernstock | 428/95 |
| 4,678,694 | 7/1987 | Claessen et al. | 428/922 X |
| 4,689,256 | 8/1987 | Slosberg et al. | 428/95 |
| 4,702,950 | 10/1987 | Slosberg et al. | 428/95 |
| 4,798,644 | 1/1989 | Scott et al. | 428/95 |
| 4,808,459 | 2/1989 | Smith | 428/95 |
| 4,824,498 | 4/1989 | Goodwin et al. | 428/95 X |
| 4,871,603 | 10/1989 | Malone | 428/300 X |
| 4,875,954 | 10/1989 | Griffiths et al. | 428/95 |
| 5,122,404 | 6/1992 | Fowler | 428/95 |
| 5,171,619 | 12/1992 | Reuben | 428/95 |
| 5,198,277 | 3/1993 | Hamilton et al. | 428/92 |

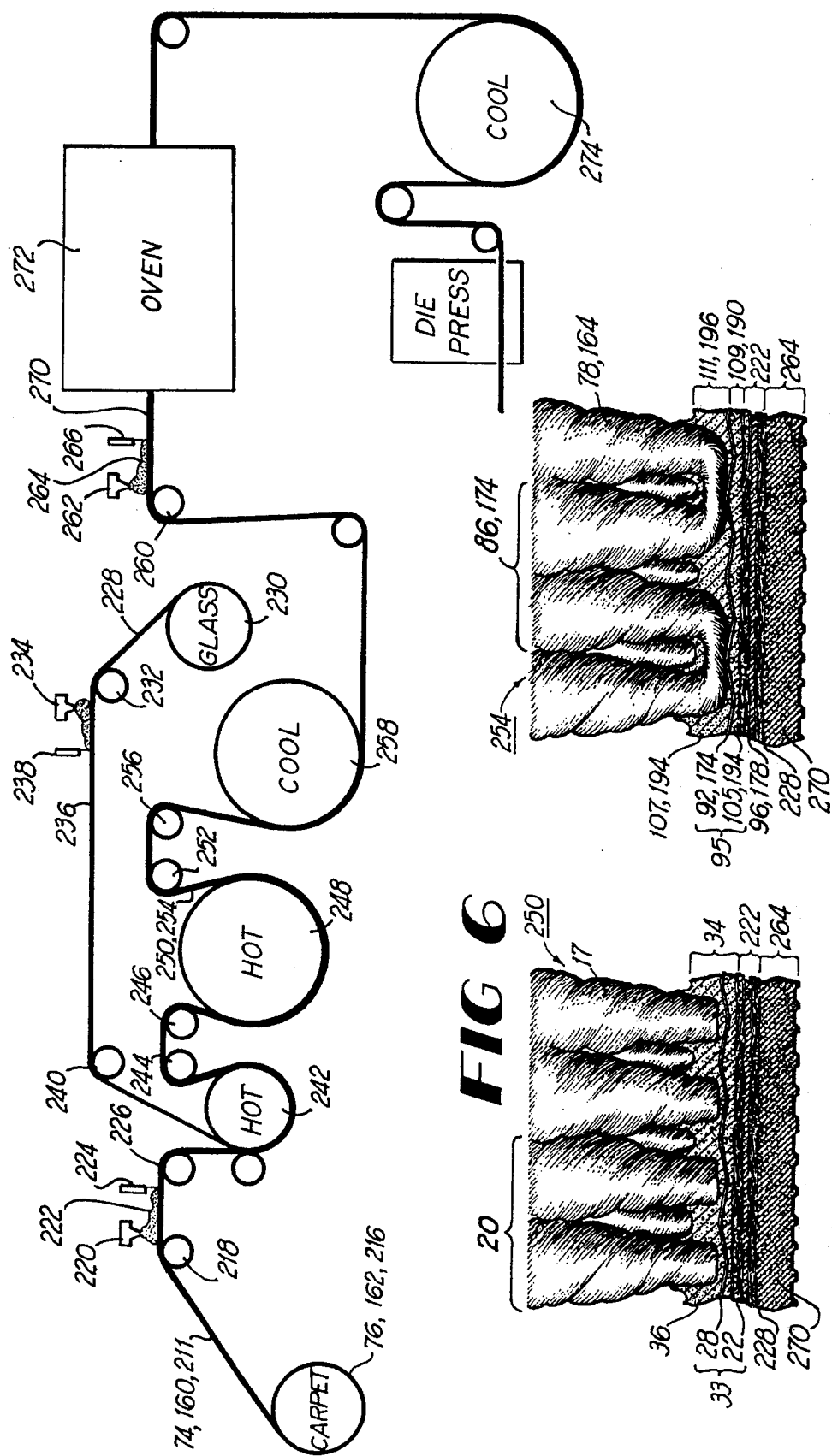

LATEX FUSION BONDED PILE CARPETS AND CARPET TILE

This is a continuation of U.S. Ser. No. 07/808,423 filed Dec. 16, 1991 by Lawrence W. Blakely and Michael A. Howe entitled "Latex Fusion Bonded Pile Carpets and Carpet Tile," now abandoned, which is a continuation-in-part application of U.S. Ser. No. 07/713,300 filed on Jun. 11, 1991, now abandoned, which is a continuation of U.S. Ser. No. 07/224,057, filed on Jul. 25, 1988 by Lawrence W. Blakely and Michael A. Howe.

BACKGROUND OF THE INVENTION

This invention relates to fusion bonded pile carpet and carpet tile which use a non-hot melt latex as the yarn-locking adhesive and to production methods for such carpet and carpet tile.

Pile carpet is generally manufactured in one of two ways. The pile yarn may be woven or tufted through a primary backing. The yarn is then secured to the primary backing with an adhesive precoat. This type of carpet in which yarn is mechanically as well as adhesively attached to backing is generally termed "woven" or "tufted" carpet. Alternatively, yarn may be cut or looped and positioned to form a pile layer that is then secured to the primary backing with adhesive. Carpet of this type is commonly referred to as "fusion bonded" carpet.

Fusion bonded carpet is generally categorized by the way the pile yarn layer is produced. In an "I-tuft" process, yarn is first cut into short, straight strands, and then the yarn ends are bonded to a primary support backing with adhesive. In a "U-tuft" process, a pile yarn layer is formed of folded yarn strands. The folded sections of the strands are then secured to the primary backing with an adhesive layer such that in the final carpet product, both ends of each cut strand protrude from the adhesive base.

The most widely used method of manufacture of fusion bonded carpet presently involves the use of a nonlatex PVC (polyvinyl chloride) plastisol formulation as the bonding adhesive. Typically, PVC plastisol is dispensed over a support layer to form an adhesive layer that penetrates into the support layer. The adhesive layer is then contacted with pile forming yarn. The PVC plastisol is cured, creating a product in which the yarn fibers are secured in the PVC layer and thereby bonded to the support layer. Increased strength may be obtained by bonding a secondary backing to the support layer.

In order to make a durable fusion bonded carpet in which the support layer does not peel away from the secondary backing, the adhesive which has permeated into the support layer must contact and bond with the material forming or adhering the secondary backing. The use of a nonlatex plasticized PVC as the yarn locking adhesive limits the variety of backing structures that may be applied to the carpet. This is true because nonlatex PVC plastisol does not bond strongly to common carpet backing materials such as bitumen, EVA (ethylene-vinylacetate), APP (atactic polypropylene), hot melts, urethanes, and SBR (styrene-butadiene). Furthermore, PVC plastisol is relatively expensive.

A fusion bonded carpet which does not use PVC as the pile yarn adhesive is described in U.S. Pat. Nos. 4,371,576 and 4,576,665. The carpet is prepared by forcing a heated hot melt adhesive through a liquid permeable support layer to contact with the pile forming yarn on the opposite side of the base layer. The adhesive is then allowed to cool, during which time the pile forming yarn and support layer are secured.

Hot melt adhesives have been known for many years and usually include a thermoplastic resin, wax and a polymeric adhesive. Typically such compositions have a melt viscosity of significantly less than about 200,000 cps, and more typically, less than 100,000 cps at 300° F., to enable them to have sufficient flow characteristics at the application temperature. Hot melt adhesives are applied at high temperature, and cured by cooling.

SUMMARY OF THE INVENTION

The present invention is a fusion bonded carpet in which the pile yarn is secured in a latex adhesive base and methods of manufacture of such carpet. The latex adhesive base is compatible with a wide variety of adhesives and secondary backings, which provides the carpet manufacturer with a greater flexibility in choosing materials for carpet construction. Latex adhesives provide strong fiber lock and wear durability. Furthermore, latex is relatively inexpensive, and has good combustion performance.

Any latex that provides the above-identified features can be used in the adhesive base. Nonlimiting examples of latexes which may be used in the present invention include vinyl polymers that are polymers or copolymers of hydrocarbon alkenes (including ethylene, propylene, and butylene), acrylonitrile, vinyl acetate, acrylic acid or its alkyl ester, $\alpha$ or $\beta$-alkyl acrylic acid or its alkyl ester including methacrylic acid and methacrylate, styrene, vinylidene chloride, vinyl chloride, and dienes including butadiene. Specific examples of copolymers include vinyl acetate-ethylene, ethylene-vinyl acetate, styrene-butadiene, latex polyvinyl chloride, polyvinylidene chloride, vinyl acetate acrylic acid, styrene acrylic acid, acrylonitrile copolymers, and blends of these compounds.

It is therefore an object of this invention to provide a fusion bonded carpet which has a yarn locking adhesive which is compatible with a wide variety of adhesives and secondary backing materials.

It is another object of this invention to provide a fusion bonded carpet with good fiber lock and durability.

It is yet another object of the present invention to provide a fusion bonded carpet that includes a fiber-lock adhesive that is cured on heating as opposed to cooling.

It is still another object of this invention to provide a fusion bonded carpet with good combustion performance.

BRIEF DESCRIPTION OF THE DRAWINGS

FIG. 6 is a schematic representation of the third stage of manufacture of carpet in accordance with the present invention using either an I-tuft or U-tuft process.

FIG. 7 is a cross sectional view of carpet manufactured in accordance with the present invention using an I-tuft process.

FIG. 8 is a cross sectional view of carpet manufactured in accordance with the present invention using a U-tuft process.

DETAILED DESCRIPTION OF THE DRAWINGS

In the below description, woven and nonwoven fiberglass are used as examples of reinforcing, or support, layers in the carpet or carpet tile. It should be understood that the invention is not limited to this, and any scrim known to those skilled in the art can be substituted for the fiberglass. The term "scrim" as used herein refers to a lightweight, open-weave woven or nonwoven fabric. Nonlimiting examples are woven and nonwoven polyester, nylon, and polypropylene and blends of these materials with fiberglass or with each other. Generally, a scrim is selected that has a melt viscosity that is higher than that of the backing layer.

The following detailed examples are merely illustrative of fusion bonded carpet and carpet tile that can be prepared according to the method described herein, and are not intended as a limitation of the invention. As described, a wide variety of latexes can be used as the yarn-locking adhesive of the carpet and carpet tile, and a wide variety of materials can be used for support and lamination.

Figure 1:
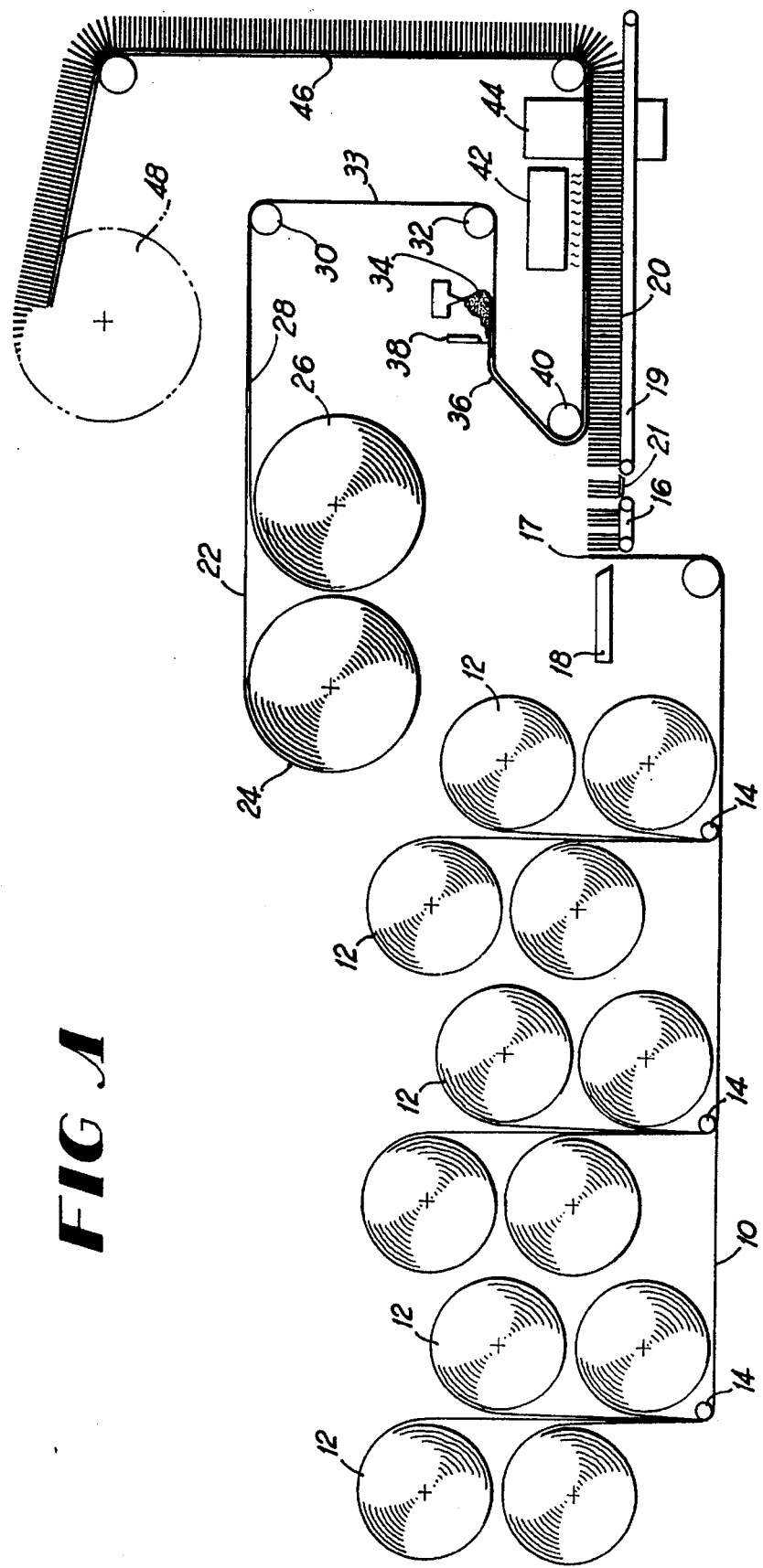
FIG. 1 is a simplified side elevation view of apparatus for the first stage of manufacture of carpet in accordance with the present invention using an I-tuft process.

In one embodiment of the present invention, precursor I-tufted carpet is manufactured as illustrated in FIG. 1 by advancing yarn strands 10 from beams 12 past guide rolls 14 to a belt 16, positioned adjacent and normal to the yarn strands 10. The yarn 10 advances to a predetermined height above the belt 16, where a cutting blade 18, positioned slightly above and parallel to the belt 16 oscillates forward across the edge of the belt 16, severing the yarn 10 and forcing the cut strands 17 onto the belt 16. The cutting blade 18 then oscillates backward, allowing for the further advancement of yarn strands 10, and repetition of the yarn cutting procedure. Advancement of yarn 10 and oscillation of the cutting blade 18 are synchronized to cause rapid propagation of cut strands 17 onto and across the belt 16, producing a pile yarn aggregation 20 of side-by-side yarns 17 standing on end on belt 16. The pile yarn aggregation 20 travels across the belt 16, over plate 21, and onto a conveyor 19.

Simultaneously, a web of non-woven fiberglass 22 from roll 24 and a web of fiberglass mesh 28 from roll 26 are advanced together over guide rolls 30 and 32. The nonwoven fiberglass 22 together with fiberglass mesh 28 constitute the primary backing 33. A latex adhesive formulation (latex in an aqueous base) 34 is dispensed onto the advancing fiberglass mesh 28 which provides a layer 36 of adhesive which penetrates through the fiberglass mesh layer 28 into the nonwoven fiberglass web 22. Uniformity of spread and thickness of the latex 36 is achieved by means of a doctor blade 38. The viscosity of the latex formulation (latex polymer in aqueous solution) may range from 20,000–150,000 cps (centipoise), with an optimal range of 40,000–120,000 cps.

A portion of the latex formulation 34 penetrates into the fiberglass mesh 28 and nonwoven fiberglass 22, which results in bonding of the two layers 22 and 28 when the adhesive 34 is cured. The desired thickness of the latex layer 36 is dependent on the yarn used and the positioning and density of the yarn strands 17 in the pile yarn aggregation 20. An adhesive layer 36 of thickness of 0.050–0.150 inch is adequate for an I-tufted pile yarn aggregation for carpet with a final yarn weight in the range of 15–70 ounces/yd$^2$.

The fiberglass mesh 28 and nonwoven fiberglass layer 22 carrying the latex adhesive layer 36 travels around marriage roller 40, which presses the adhesive 36 into the ends of cut yarn strands 17 of the pile yarn aggregation 20. The yarn strands 17 adhere to the latex layer 36, and the advancing yarn 17 and primary backing 33 composition travels past a heater 42, positioned on the backing 33 side of the composition, which raises the temperature of the latex 36 to the boiling point of water. The temperature must be elevated at a rate sufficiently slow to prevent rapid bubbling of the water out of the latex, which results in the separation of the latex 36 from the cut fibers 17. For example, an IR (infrared) heater with a flux density of 6–25 watts/in$^2$ may be used at 25–75% of maximum capacity, with an exposure time of 1–5 minutes. The carpet then passes through a high velocity hot-air dryer 44, which blows hot air to remove the moisture expelled from the latex layer 36. The air temperature within the dryer 44 should be 200°–300° F., and dwell time within the dryer 44 should be 2–10 minutes.

Figure 2:
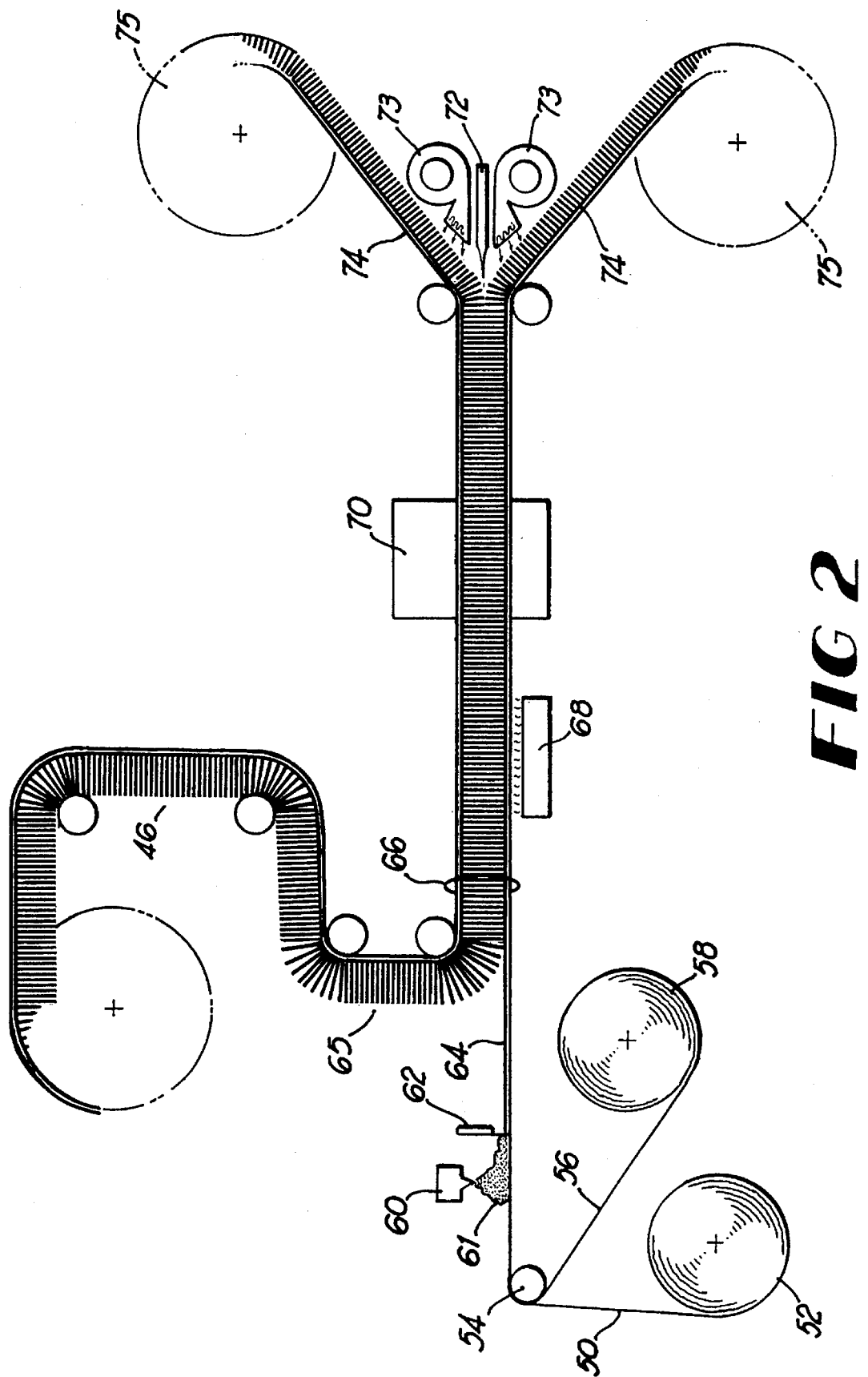
FIG. 2 is a simplified side elevation view of apparatus for the second stage of manufacture of carpet in accordance with the present invention using an I-tuft process.

The precursor I-tufted carpet 46 with cured adhesive 36 is then either collected onto roll 48, or proceeds directly to Stage II of the I-tuft procedure, as illustrated in FIG. 2. There, fiberglass mesh 50 from roll 52 is advanced together with and above a web of nonwoven fiberglass 56 from roll 58 under a dispenser 60, which deposits a latex formulation 61 on the fiberglass mesh 50 and nonwoven fiberglass 56. Spreading of the latex 64 is accomplished with a doctor blade 62. Penetration of the fiberglass mesh 50 and nonwoven fiberglass 56 occur as described in Stage I above. The fiberglass mesh 50 and nonwoven fiberglass 56 is advanced with the simultaneously advancing precursor I-tufted carpet 46 from Stage I (FIG. 1) so that latex adhesive layer 64 contacts yarn ends 65. As the cut yarn ends 65 embed securely into the latex layer, a sandwich structure 66 is formed comprising layers of nonwoven glass 22, fiberglass mesh 28, (cured) latex 36, cut pile yarn aggregation 20, (uncured) latex 64, fiberglass mesh 50 and nonwoven glass 56. The sandwich 66 travels past a heater 68 which raises the temperature of the latex to the boiling point of water at a rate sufficiently slow to prevent rapid bubbling of the water out of the latex. For example, an IR (infrared) heater with a flux density of 6–25 watts/in$^2$ may be used at 50–75% of a maximum capacity with an exposure time of 1–10 minutes. The sandwich 66 then travels through a hot air dryer 70, where hot moisture is removed. A dwell time of 2–10 minutes in air at a temperature of 275°–325° F. is sufficient to remove the moisture and cure the latex. The pile yarn aggregation 20 of the sandwich 66 is then severed by splitter 72, to provide two carpet webs 74; which are further dried by hot air dryers 73, and collected onto rolls 75.

Figure 3:
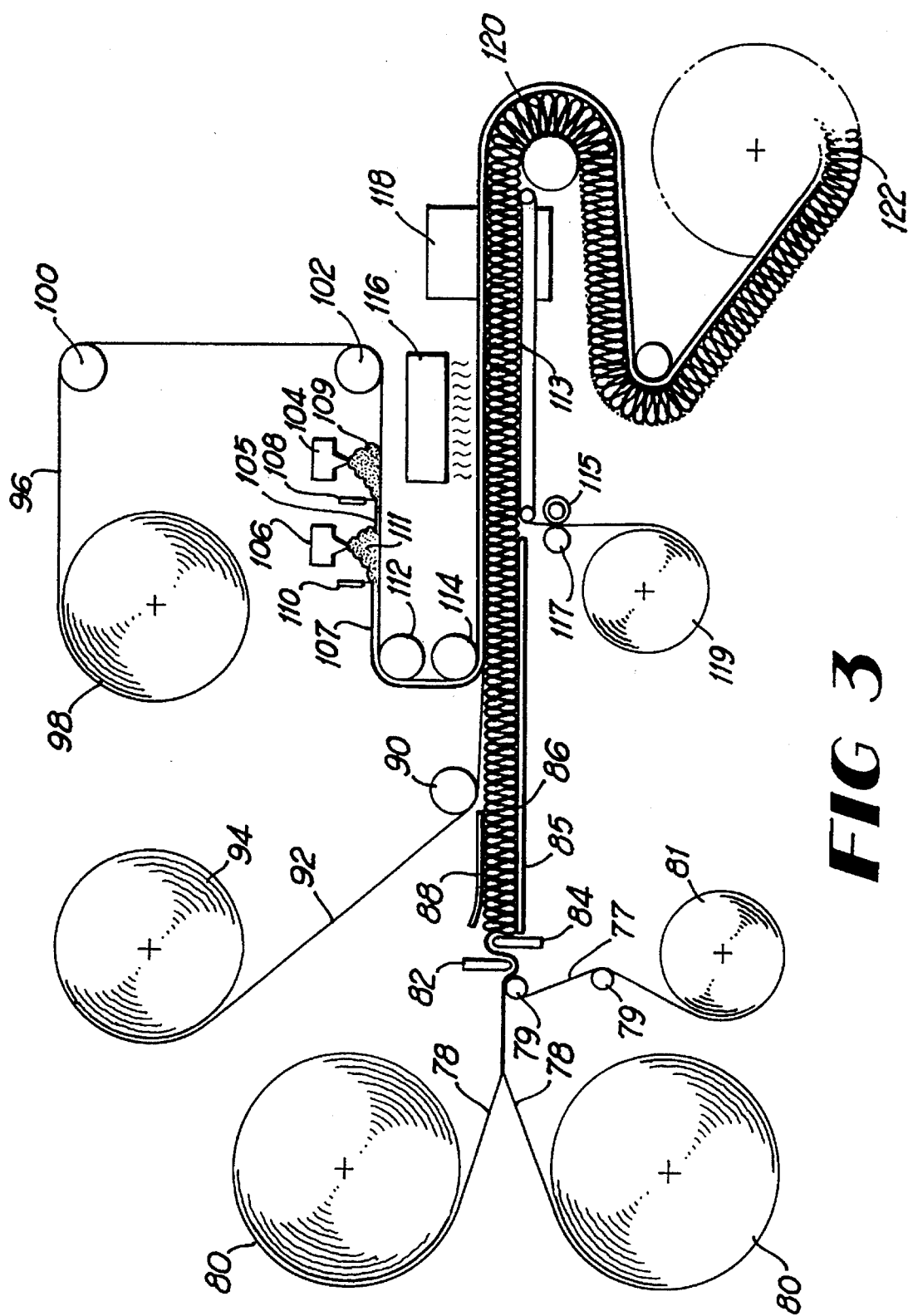
FIG. 3 is a simplified side elevation view of apparatus for the first stage of manufacture of carpet in accordance with the present invention using a U-tuft process.

In the first stage of one U-tuft embodiment of the present invention, as illustrated in FIG. 3, yarns 78 supplied from beams 80 are fed along with support paper 79 from roll 81 past upper and lower pleater bars 82 and 84, respectively, which reciprocate transverse to the plane in which the yarns 78 and support paper 79 travel to form a pleated yarn aggregation 86. The advancing pleated aggregation 86 advances over bed 85 and is maintained with a rigid sheet 88 which extends between pleater bars 82, 84 and guide roll 90. Advancing fiberglass mesh 92 from roll 94 travels under guide roll 90 to lie against and travel with the pleated aggregation 86.

A nonwoven fiberglass web 96 from roll 98 also travels around guide rolls 100, 102 past a first dispenser 104 which applies a layer 105 of high viscosity latex formulation 109 (50,000–120,000 cps) and a second dispenser 106, which provides a layer 107 of low viscosity latex formulation 111 (latex polymer in an aqueous solution) (10,000–50,000 cps) on top of the layer of high viscosity latex formulation 105. Uniformity of spread and thickness of each latex layer is achieved with doctor blades 108 and 110 positioned after each latex dispenser 104 and 106. The nonwoven fiberglass 96 with latex adhesive upper coatings 105 and 107 then travels around guide roll 112 and is pressed by marriage roller 114 into contact with the fiberglass mesh 92. The low viscosity latex formulation layer 107 penetrates through the fiberglass mesh 92 and into the yarn pleating 86, securing the pleats in the adhesive. The high viscosity latex layer 105 penetrates into the fiberglass mesh 92, bonding it to the nonwoven glass layer 96. The fiberglass mesh layer 92 and the nonwoven glass layer 96 together form support layer 95 (See FIG. 8).

Support paper 77 is pulled from the pleated yarn aggregation 86 by a motor driven master roll 115 with slave roll 117, positioned past and below bed 85. The paper is collected onto beam 119.

The nonwoven fiberglass 96, with fiberglass mesh 92 and pleated pile 86 underneath, advance onto belt 113 and travels past a heater 116 and high velocity hot-air dryer 118, under the conditions described above for Stage I of the I-tuft procedure (FIG. 1). The precursor U-tufted carpet 120 so formed may be collected onto roll 122 or may proceed directly into Stage II of the U-tuft procedure, as illustrated in FIG. 4.

Figure 4:
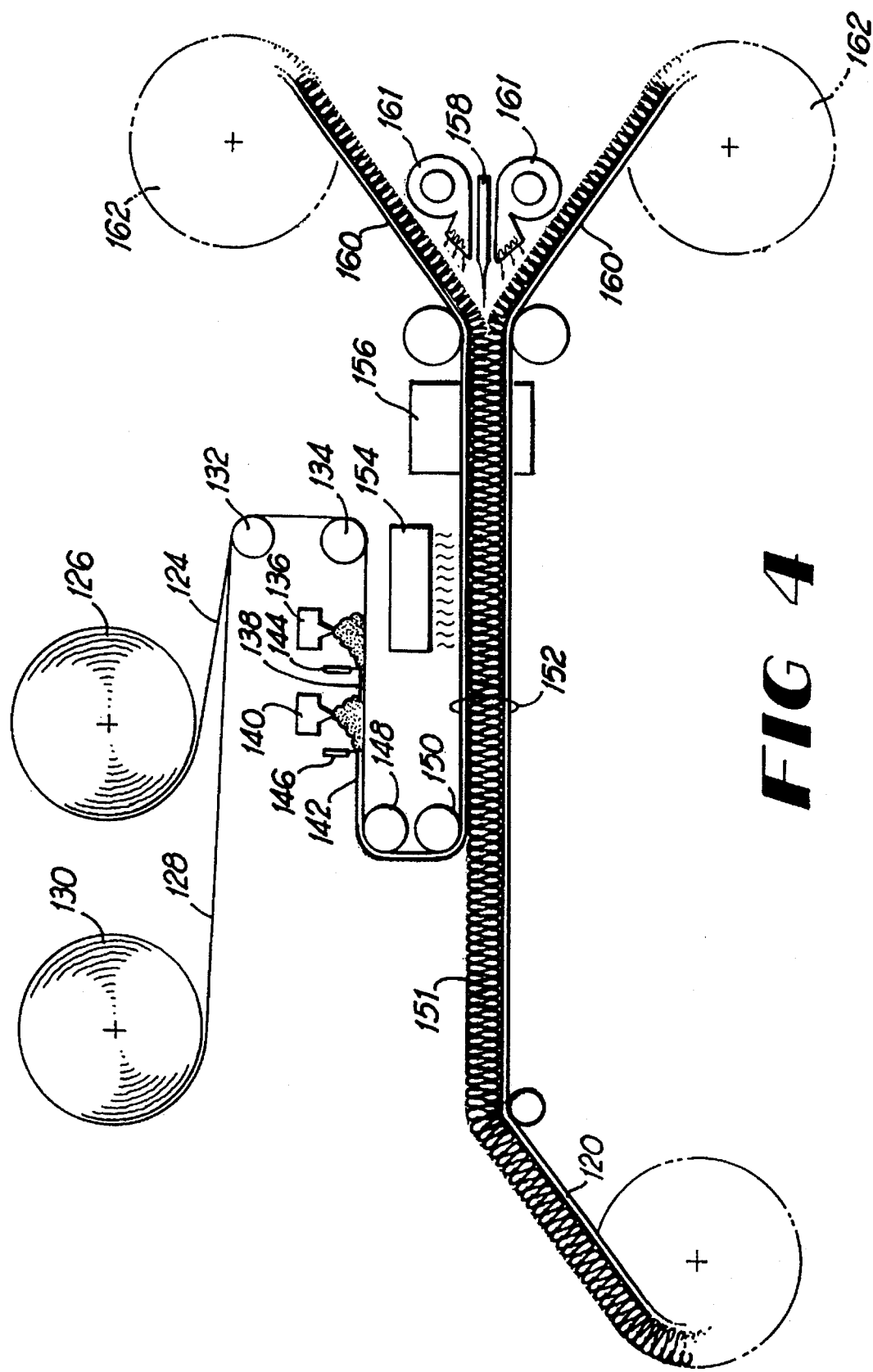
FIG. 4 is a simplified side elevation view of apparatus for the second stage of manufacture of carpet in accordance with the present invention using a U-tuft process.

In Stage II of the U-tuft process of the present invention, as illustrated in FIG. 4, nonwoven fiberglass web 124 from roll 126 is advanced together with fiberglass mesh 128 from roll 130 around guide roll 132 and 134 and past a first dispenser 136 which applies a layer of high viscosity latex formulation 138 (40,000–120,000 cps) to the surface of the fiberglass mesh; and past a second dispenser 140, which provides a layer of low viscosity latex formulation 142 (10,000–50,000 cps) on top of the high viscosity latex formulation 138. Uniformity of spread and thickness of each latex layer is achieved with doctor blades 144, 146. The high viscosity latex layer 138 penetrates through the fiberglass mesh into the nonwoven glass. The fiberglass mesh 128 and nonwoven fiberglass web 124 carrying the latex adhesive layer 142 travel past guide roll 148 to marriage roll 150 where the adhesive 142 is pressed into contact with the unbonded pleated pile 151 of the precursor U-tufted carpet 120 from Stage I of the U-tufted process (FIG. 3). The low viscosity latex formulation layer 142 penetrates into the unbonded pleated pile 151 surface of the precursor U-tufted carpet 120, securing the pleats into the adhesive 142. A U-tufted sandwich 152 results, comprising layers of nonwoven glass 124, fiberglass mesh 128, (uncured) latex 138, 142, pleated pile 86, (cured) latex 105, 107, fiberglass mesh 92 and nonwoven glass 96. This U-tuft sandwich travels past a heater 154, and then through a hot air oven 156 to remove the hot moisture, under the same conditions as described in Stage II of the I-tuft procedure (FIG. 2). The pleated yarn of the U-tufted sandwich is then severed by splitter 158, to provide two U-tufted carpet webs 160, further dried by hot air dryers 161 and collected onto rolls 162.

Figure 5:
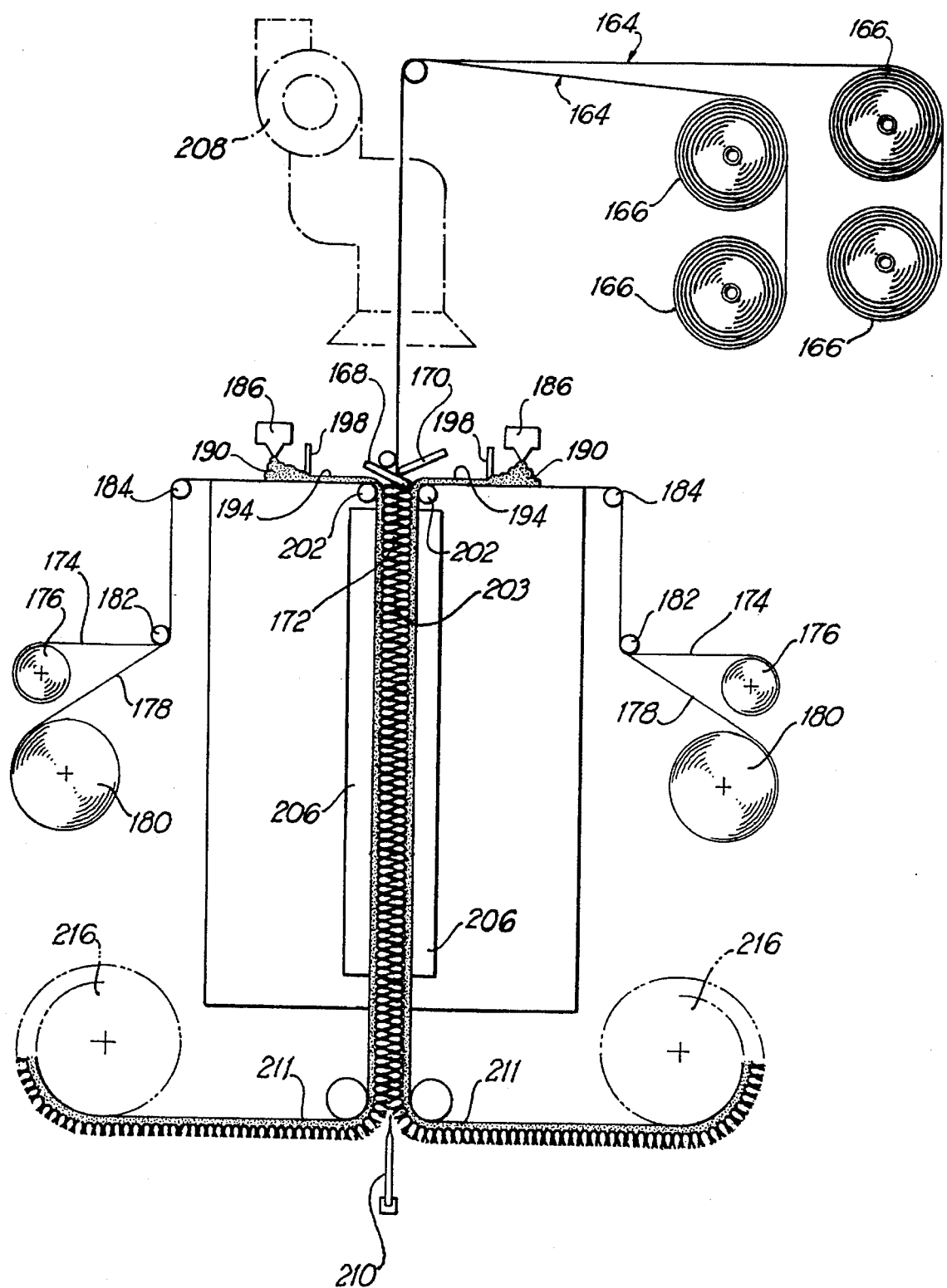
FIG. 5 is a simplified cross sectional view of apparatus for the manufacture of carpet in accordance with the present invention.

In another, substantially vertically-oriented carpet manufacturing system of the present invention illustrated in FIG. 5, advancing fiberglass mesh 174 from roll 176 together with a nonwoven fiberglass web 178 from roll 180 travel around guide rollers 182 and 184 past dispenser 186 which applies a layer 194 of high viscosity latex formulation 190 (50,000–120,000 cps). Uniformity of spread and thickness of the latex layer is achieved with doctor blades 198 positioned after the latex dispenser 186. An adhesive layer 194 of thickness of 0.050–0.150 inch is adequate for an U-tufted pile carpet with a final yarn weight in the range of 15–70 ounces/yd$^2$.

Yarns 164 supplied from beams 166 are fed past pleater bars 168 and 170 which cross at an angle and force the individual pleats of pleated yarn aggregation 172 into adhesive layer 194 to form a U-tufted sandwich 203. The adhesive layer 194 penetrates into the fiberglass mesh 174, bonding it to the nonwoven fiberglass web 178. The fiberglass mesh layer 174 and the nonwoven fiberglass web layer 178 together form support layer 95 (see FIG. 8).

Figure 9:
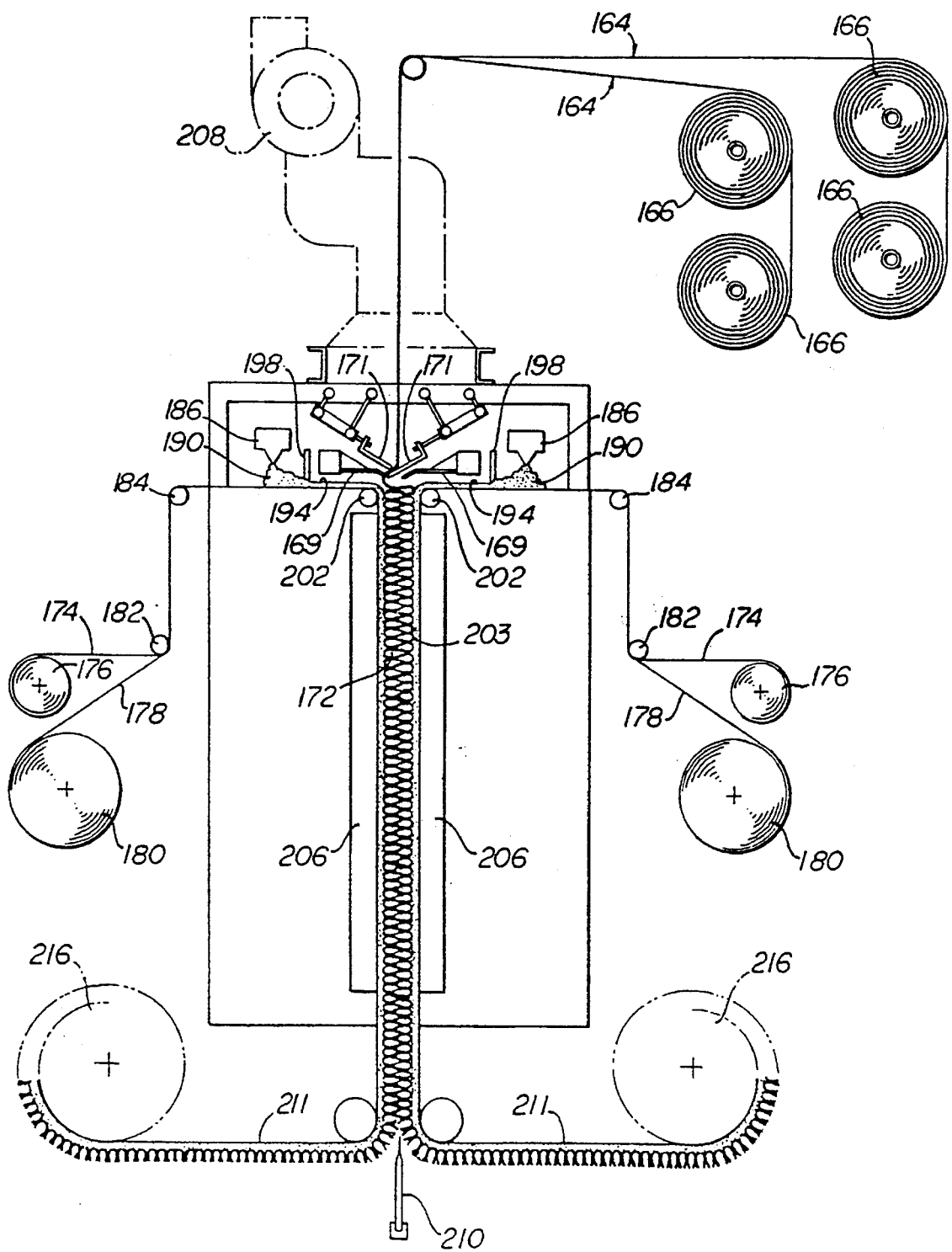
FIG. 9 is a simplified cross sectional view of an apparatus for the manufacture of carpet similar to the apparatus illustrated in FIG. 5.

Alternatively, as shown in FIG. 9, two sets of pleater bars, 169 and 171 can be used to form the pleats of pleated yarn aggregation 172. Pleater bars 171 form the individual pleats while pleater bars 169 force the pleats into adhesive layer 194 to form U-tufted sandwich 203.

The U-tufted sandwich 203 advances through heater 206 which raises the temperature of the latex to the boiling point of water at a rate sufficiently slow to prevent rapid bubbling of the water out of the latex. For example, an IR (infrared) heater with a flux density of 6–25 watts/in$^2$ may be used at 50–75% of a maximum capacity with an exposure time of 1–10 minutes. An exhaust fan 208 draws air up through heater 206 and aids in the curing process. The pleated yarn aggregation 172 of the U-tufted sandwich 203 is then severed by splitter 210, to provide two U-tufted carpet webs 211 before being collected on rolls 216. If desired, carpet webs 211 contained on rolls 216 can be subsequently sheared to a uniform height.

Other vertical bonding systems, such as that disclosed in U.S. Pat. No. 4,576,665 to Machell (which patent is incorporated herein in its entirety by this reference), can also be utilized in connection with embodiments of the present invention. If one or more suitably-permeable base layers (such as, but not limited to, scrim) are chosen, for example, the latex formulation can be forced from the back through the permeable layers to bond the pile. Using latex rather than the hot melt adhesive of Machell provides the product with, among other things, improved bonding characteristics, and is cured by heating instead of cooling. In such a system the latex also can be applied after the multi-layer sandwich structure is formed.

In one embodiment of the present invention, a nonwoven fiberglass layer is laminated to the I-tufted or U-tufted carpet sheet 74, 160, or 211 before a secondary backing, if desired, is applied. This fiberglass mesh support layer allows for added dimensional stability of the final carpet product, as described in U.S. Pat. Nos. 4,010,301 and 4,010,302, incorporated herein by reference. This is illustrated in FIG. 6 where I-tufted 74 or U-tufted 160, or 211 carpet webs from rolls 76, 162, or 216 respectively, travel past guide roll 218 to a first dispenser 220 which applies a puddle of laminating adhesive 222 to back of the carpet. This laminating adhesive 222 may be a nonlatex PVC plastisol, or a compatible latex adhesive. Doctor blade 224, positioned after the first dispenser, insures the proper thickness and spread of the adhesive layer 226. Simultaneously, nonwoven fiberglass 228 from roll 230 travels around guide roll 232 past a second dispenser 234 which applies a layer of laminating adhesive 236 to the surface of the nonwoven fiberglass 228, a portion of which penetrates into the fiberglass. Doctor blade 238, positioned after the dispenser, insures proper thickness and spread of the laminating adhesive layer 236. The nonwoven fiberglass 228 with laminating adhesive layer 236 then travels past guide roll 240 to a first heating means 242, where the adhesive layer 236 on the nonwoven fiberglass 228 contacts laminating adhesive layer 226 of the carpet web 74, 160, or 211. The heating means should be at a temperature sufficient to cure the adhesive. For example, hot oil drums at a temperature from 400° F. to 475° F. may be employed when the adhesive is a nonlatex PVC plastisol. The carpet web 74, 160, or 211 with adhesives 226, 236 and nonwoven fiberglass support 228 proceeds past guide rolls 244 and 246 past a second heating means 248 to further cure the adhesive. The temperature range of the second heating means may be in the same range as that of the first heating means. Optionally, the carpet web so produced 250 or 254 continues around guide rolls 252 and 256, past a cooling means 258 to guide roll 260. For example, the cooling means 258 may be a cool water drum.

In an alternate embodiment, if the nonwoven fiberglass is not desired in the secondary backing, the carpet web 74, 160, or 211 from rolls 76, 162, or 216, respectively may advance directly to guide roll 260. In either embodiment, the carpet travels past a third dispenser 262 which applies a liquid secondary backing material 264 to the back of the carpet. Doctor blade 266 or coater (not illustrated) insures uniformity of spread and thickness of the backing layer 270. The liquid secondary backing material 264 is generally of a viscosity range 10,000–20,000 cps. Liquid secondary backing materials include high viscosity PVC plastisol, atactic polypropylene, polyvinylidene chloride, bitumen, ethylene-vinyl acetate, hot melt formulations and urethanes. The liquid secondary backing materials may be formulated with fillers, flame retardants, thickeners or other compounds to increase their usefulness as carpet backing.

The carpet web 74, 160, or 211 with liquid secondary backing material 270 proceeds through curing means 272, which solidifies the backing material. If the curing means is heat, it is important that it not be directed to the pile surface of the carpet in order to protect the pile yarn from charring.

The carpet web 74, 160, or 211 with cured secondary backing 270 advances, optionally, past cooling means 274 to roller or alternatively, to a die press (neither illustrated) for the manufacture of carpet tile.

In yet another embodiment of the present invention, not illustrated, a solid or expanded (open or closed cell) secondary backing may be laminated to the carpet sheets formed as described herein, for example, in accordance with FIG. 1 through 5 and FIG. 9. Typical secondary backing materials include urethane films, woven or nonwoven fabrics, bitumen, polyester, polyamides, polyethylene, ethylene-vinyl acetate (EVA), polyvinyl chloride, atactic polypropylene (APP), or polyvinylidene chloride (PVC). Adhesives for these secondary backing materials include atactic polypropylene, SBR, VAE, EVA, PVDC, PVC and urethane.

FIG. 7 is a cross sectional view of carpet 250 manufactured in accordance with the present invention using an I-tuft process and the apparatus of FIGS. 1, 2 and 6. Cut yarn strands 17 form a pile yarn web 20 such that only one end of each yarn strand protrudes out of the upper surface of a latex adhesive base layer 36. Support layer 33 of fiberglass mesh layer 28 and nonwoven glass 22 is adjacent to the lower surface of the latex adhesive base 36. A second layer of nonwoven fiberglass 228 is positioned beneath the nonwoven fiberglass 22 and secondary backing 270 is beneath the nonwoven fiberglass 228. FIG. 7 further illustrates the manner of adhering the carpet layers according to the present invention. The latex adhesive 34 penetrates through the first fiberglass mesh layer 28 into the nonwoven fiberglass 22 where it contacts and bonds with liquid adhesive 222 used to laminate the second layer of nonwoven fiberglass 228 to the nonwoven fiberglass 22. The liquid adhesive 222 embedded in the second nonwoven fiberglass layer 228 further contacts and bonds with the secondary backing material 264. In the preferred mode, the liquid adhesive has the same composition as the secondary backing material, minimizing the number of bonding adhesive interfaces.

Carpet 254 manufactured in accordance with the present invention using a U-tufted process, illustrated in FIG. 8, is identical in structure to the carpet 250 illustrated in FIG. 7, with the exception that the pile yarn web 86 comprises folded yarn strands, which are secured in an adhesive base layer 107, 142, or 194 such that both ends of each folded strand protrude from the base.

One of the advantages of the present invention over the prior methods of preparation of fusion bonded carpet is that a variety of secondary backings may be employed.

As described above, in carpet made in accordance with the present invention, for example, as illustrated in FIG. 7, there may be two polymeric bonded interfaces, that of the latex adhesive fusion bonding material 36 with the adhesive 222 used to adhere the second nonwoven fiberglass support layer 228, and that of the adhesive 222 with the secondary backing material 264 or adhesive used to bind the secondary backing. In the preferred mode, the adhesive 222 has the same composition as the secondary backing material 264 or adhesive used to bind the secondary backing, minimizing the number of polymeric bonding interfaces to one.

Nonlatex PVC plastisol as the pile yarn web bonding adhesive limits the choice of adhesives which may be used in carpet construction because nonlatex PVC plastisol does not bind adequately to common carpet adhesives and backing materials other than polyvinyl chloride, such as atactic polypropylene, bitumen, urethane, ethylene vinylacetate, styrene butadiene, polyester, polyamide, and polyethylene. When the adhesive of the fusion bonded carpet forms a weak bond with the adjacent polymeric formulation, there is a potential for carpet peel, which reduces the useful life of the carpet. Latexes described in the present invention will bond adequately to most common backing materials, to form a carpet product that will not peel over time.

Any latex that provides the herein-identified characteristics can be used in the adhesive base. Nonlimiting examples of latexes which may be used in the present invention include vinyl polymers that are polymers or copolymers of hydrocarbon alkenes (including ethylene, propylene, and butylene), acrylonitrile, vinyl acetate, acrylic acid or its alkyl ester, $\alpha$ or $\beta$-alkyl acrylic acid or its alkyl ester including methacrylic acid and methacrylate, styrene, vinylidene chloride, vinyl chloride, and dienes including butadiene. Specific examples of copolymers include vinyl acetate-ethylene, ethylene-vinyl acetate, styrene-butadiene, latex polyvinyl chloride, polyvinylidene chloride, vinyl acetate acrylic acid, styrene acrylic acid, acrylonitrile copolymer, and blends of these compounds. The latex polymers that are used in the latex adhesive base generally have a melt viscosity of over 300,000 cps, and more typically over 500,000 cps at 300° F.

The latex may be formulated with other compounds to increase its suitability as a fusion bonding adhesive and to impart added beneficial properties to the carpet. See Table I in Example I. For example, a flame retardant may be added such as alumina trihydrate, which at high temperature generates steam instead of smoke.

Other extenders and flame retardants known to those skilled in the art can also be included, including but not limited to carbonates, such as $CaCO_3$ and $MgCO_3$, clay, borates, sulfates, phosphates, metal oxides, decabromodiphenyl, and antimony oxide.

A dispersing agent may be added to the latex formulation to insure that the flame retardant is sufficiently evenly distributed. An example is Narlex-LD 45 by National Starch and Chemical Corporation.

A defoamer may be added to minimize frothing during the mixing cycle. An example of a defoaming agent is Foammaster VF from Henkel Corporation. Alternatively a surfactant can be used if the latex is to be mechanically foamed.

The viscosity of the latex adhesive may be adjusted as necessary with a thickener such as Natrosol 250HR by Hercules, Inc. or Paragum 141 by Parachem Southern, Inc. Natrosol 250 HR is activated at a pH greater than 7.0, and therefore a base such as ammonia may be added to the latex formulation to increase the pH as necessary. Diatomaceous earth can also be used as a viscosity adjusting agent.

Catalysts may be added to crosslink the latex. For example, ammonium chloride acts as a catalyst to crosslink vinylacetate-ethylene. Crosslinking of a latex adhesive with the aid of compounds such as melamine is beneficial to prevent softening and degradation of the adhesive layer on exposure to water.

The present invention may be further understood by reference to the following working examples which are intended to illustrate the invention only and not limit its scope.

Example I

Preparation of Fusion Bonded Carpet with Latex Adhesive Formulation

A carpet is prepared in accordance with FIGS. 1 and 2 or FIGS. 3, 4, 5, or 9, with a latex adhesive formulation as described in TABLE I.

TABLE I

| LATEX ADHESIVE FORMULA | |
|---|---|
| Ingredient | Parts By Weight |
| Latex | 180–250 |
| Alumina Tri-Hydrate | 50–250 |
| Ammonium Chloride | 0–10 |
| Ammonia | as required to raise pH above 7.0 if Natrosol 250 HR is used |
| Narlex-LD 45 (Dispersing Agent for ATH) | 0–3 |
| Defoamer | 0–3 |
| Natrosol 250 HR (Thickener) | as required |
| Cymel 373 | 0–10 |

Example II

Preparation of Fusion Bonded Carpet with Latex Adhesive Formulation

A carpet is prepared in accordance with FIGS. 1 and 2 or FIGS. 3, 4, 5 or 9, with a latex adhesive formulation as described in Tables II, III, IV, or V.

TABLE II

| VAE Adhesive Formula | |
|---|---|
| Ingredient | Parts By Weight |
| VAE Latex | 159 |
| Aluminum Tri-Hydrate | 150 |
| Defoamer | 0.1 |
| Ammonia | 0–20 |
| Paragum 141 | as needed to give desired viscosity |
| Carbon Black | 5 |

TABLE III

| Ingredient | Parts By Weight |
|---|---|
| SBR Latex | 200 |
| $AL(OH)_3$ | 100 |
| defoamer | 0.1 |
| dispersant | 0.1 |
| Paragum 141 | as needed |

TABLE IV

| Ingredient | Parts By Weight |
|---|---|
| Vinyl acrylic | 217 |
| $Al(OH)_3$ | 100 |
| defoamer | 0.1 |
| dispersant | 0.1 |
| Paragum 141 | as needed |

TABLE V

| Ingredient | Parts By Weight |
|---|---|
| EVA Latex | 158.7 |
| Aluminum Tri-Hydrate | 150 |
| Carbon Black | 5.2 |
| Defoamer | 0.34 |
| Thickener | 1.41 |

In the following Examples III–VI, the tuft bind, delamination of secondary backing, and electrical resistance of a fusion bonded carpet tile prepared with the non-hot melt latex adhesive formulation set out in Table V (Interface fusion bonded carpet Style 5826, color 50816 Mirage, referred to below as the "Interface" tile) was compared to that of a fusion bonded carpet tile prepared with a hot melt adhesive (Milliken, Everbond carpet with Everwher backing) referred to below as the "Milliken tile."

Example III

Comparison of Tuft Bind of Fusion Bonded Carpet Prepared with Non-Hot Melt Latex Adhesive and Hot Melt Adhesive The tuft bind of the Interface and Milliken fusion bonded carpet tile was compared using American Society for Testing and Materials (ASTM) D1335, at three temperatures: ambient temperature, 140° F., and 180° F. This test generally measures the strength needed to pull a tuft of yarn out of the carpet tile. The results are provided in Table VI. As indicated, at all three temperatures tested, the Interface fusion bonded carpet tile with a non-hot melt latex adhesive provided greater tuft bind than the Milliken hot melt product. The difference in tuft bind between the products is especially pronounced at higher temperatures.

TABLE VI

| Temperature | Interface | Milliken |
|---|---|---|
| Room temp. | 68.8 oz. | 64.0 oz. |
| 140° F. | 57.6 oz. | 17.6 oz. |
| 180° F. | 43.2 oz. | 11.2 oz. |

Example IV

Delamination of Secondary Backing

The force required to delaminate the secondary backing from the Interface and Milliken fusion bonded carpet tiles were evaluated using the American Society for Testing and Materials (ASTM) D3936, at three temperatures: ambient temperature, 140° F., and 180° F. The results are provided in Table VII. As indicated, at all three temperatures, more force is required to delaminate the secondary backing from the Interface product than from the Milliken product, and again, the difference increases as the temperature increases.

TABLE VII

Delamination of Secondary Backing

| Temperature | Interface Tile | Milliken Tile |
|---|---|---|
| Room temp. | 5.9 lbs/m | 4.3 lbs/m |
| 140° F. | 5.0 lbs/m | 1.2 lbs/m |
| 180° F. | 3.0 lbs/m | 0.4 lbs/m |

Example V

Measurement of Electrical Resistance using Burroughs Method

The electrical resistance of the Interface and Milliken fusion bonded carpet tiles was evaluated using the Burroughs method. The samples were loose-laid on a grounded metal foil to form an area of 36" by 54". Using electrodes as specified in NFPA Test Method 56A, the resistance was measured between one electrode placed on the face of the flooring material and another electrode placed on the face of the flooring material. Measurements at eight locations on the flooring material were made using 500 volts, direct current, on a megometer.

The Interface carpet tile exhibited a resistance of 9000 Megohms, while the Milliken carpet tile exhibited an electrical resistance of 100,000 Megohms. This indicates that the Interface fusion bonded carpet, wherein the yarn is secured in a non-hot melt fusion bonded adhesive, has good conductivity, whereas the Milliken hot melt product has insulating characteristics. Electrical conductivity in carpets is desireable to minimize static charge.

Example VI

Measurement of Electrical Resistance using the IBM Method

The electrical resistance of the Interface and Milliken fusion bonded carpet tiles was also evaluated using the IBM method. The samples were loose-laid on a grounded metal foil to form an area of 36" by 54". Using electrodes as specified in NFPA Test Method 56A, the resistance was measured between one electrode placed on the face of the flooring material and another electrode placed on the metal foil. Measurements at eight locations on the flooring material were made using 500 volts, direct current, on a megometer.

The Interface carpet tile exhibited a resistance of 5000 Megohms, while the Milliken carpet tile exhibited an electrical resistance of 100,000 Megohms. This again indicates that the Interface fusion bonded carpet, wherein the yarn is secured in a non-hot melt fusion bonded adhesive, has good conductivity, whereas the Milliken hot melt product has insulating characteristics.

This description is given for purposes of illustration and explanation. It will be apparent to those skilled in the relevant art that modifications and changes may be made to the invention as described above without departing from its scope and spirit, including, for example, substituting polyester, blends of polyester and glass, or other suitable materials for the fiberglass referenced above. In certain circumstances lamination using closed cell PVC foam additionally or alternatively may occur.

We claim:

1. A latex bonded carpet or carpet tile intermediate prior to any curing, comprising in order;
   (i) a pile yarn aggregation;
   (ii) a non-hot melt latex adhesive base:
   wherein the latex adhesive has a viscosity prior to any curing ranging between 40,000 and 120,000 cps;
   wherein the non-hot melt latex adhesive comprises a latex polymer or copolymer selected from the group consisting of
   (i) vinyl acetate-ethylene, ethylene-vinyl acetate-acrylic, styrene-butadiene, polyvinylidene chloride, vinyl acetate-acrylic acid, styrene-acrylic acid;
   (ii) polymers or copolymers of acrylic acid, alkyl acrylate, methacrylic acid, alkyl methacrylate, acrylonitrile, vinylidene chloride and vinyl acetate; and
   (iii) latex polymers or copolymers of vinyl chloride;
   wherein the pile yarn aggregation is embedded in the adhesive and protrudes therefrom; and
   (iii) a support layer.

2. The carpet or carpet tile intermediate of claim 1, wherein the latex adhesive formulation comprises a blend of polymers or copolymers.

3. The carpet or carpet tile intermediate of claim 1, wherein the latex adhesive formulation comprises a ethylene vinyl acetate.

4. The carpet or carpet tile intermediate of claim 1, wherein the support layer is selected from the group consisting of fiberglass and woven and non-woven fabrics comprising polymers selected from the group consisting of polyester, nylon and polypropylene.

5. The carpet or carpet tile intermediate of claim 4, wherein the support layer comprises a material selected from the group consisting of fiberglass and woven and non-woven fabrics comprising polymers selected from the group consisting of polyester, nylon and polypropylene.

6. The carpet or carpet tile intermediate of claim 1, wherein the support layer is fiberglass.

7. A latex bonded carpet or carpet tile intermediate according to claim 1, wherein the latex adhesive is a copolymer of butadiene and an alkyl methacrylate.

8. A latex bonded carpet or carpet tile intermediate prior to any curing, comprising in order:

(i) a pile yarn aggregation;
(ii) a non-hot melt latex adhesive base;
wherein the latex adhesive has a viscosity ranging between 40,000 and 150,000 cps prior to any curing;
wherein the non-hot melt latex adhesive comprises a latex polymer or copolymer selected from the group consisting of
  (i) vinyl acetate-ethylene, ethylene-vinyl acetate, styrene-butadiene, polyvinylidene chloride, vinyl acetate-acrylic acid, styrene-acrylic acid;
  (ii) polymers or copolymers of acrylic acid, alkyl acrylate, methacrylic acid, alkyl methacrylate, acrylonitrile, vinylidene chloride and vinyl acetate; and
  (iii) latex polymers or copolymers of vinyl chloride;
wherein the pile yarn aggregation is embedded in the adhesive and protrudes therefrom; and
a support layer.

9. The carpet or carpet tile intermediate of claim 8, wherein the latex adhesive formulation comprises a blend of polymers or copolymers.

10. The carpet or carpet tile intermediate of claim 8, wherein the latex adhesive formulation comprises ethylene vinyl acetate.

11. The carpet or carpet tile intermediate of claim 8, wherein the support layer is selected from the group consisting of fiberglass and woven and non-woven fabrics comprising polymers selected from the group consisting of polyester, nylon and polypropylene.

12. The carpet or carpet tile intermediate of claim 8, wherein the support layer comprises a material selected from the group consisting of fiberglass and woven and non-woven fabrics comprising polymers selected from the group consisting of polyester, nylon and polypropylene.

13. The carpet or carpet tile intermediate of claim 8, wherein the support layer is fiberglass.

* * * * *